Patented Jan. 20, 1953

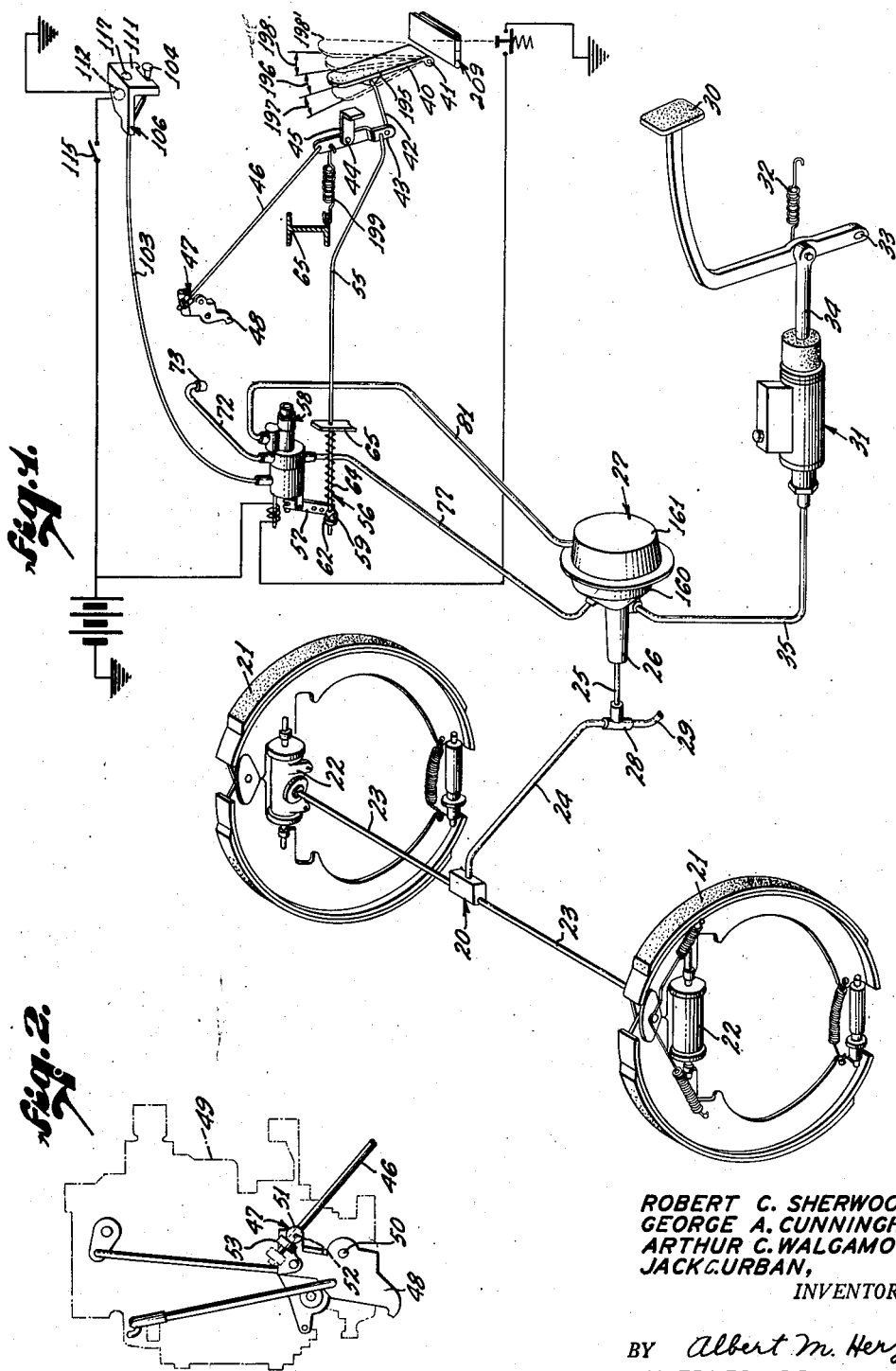

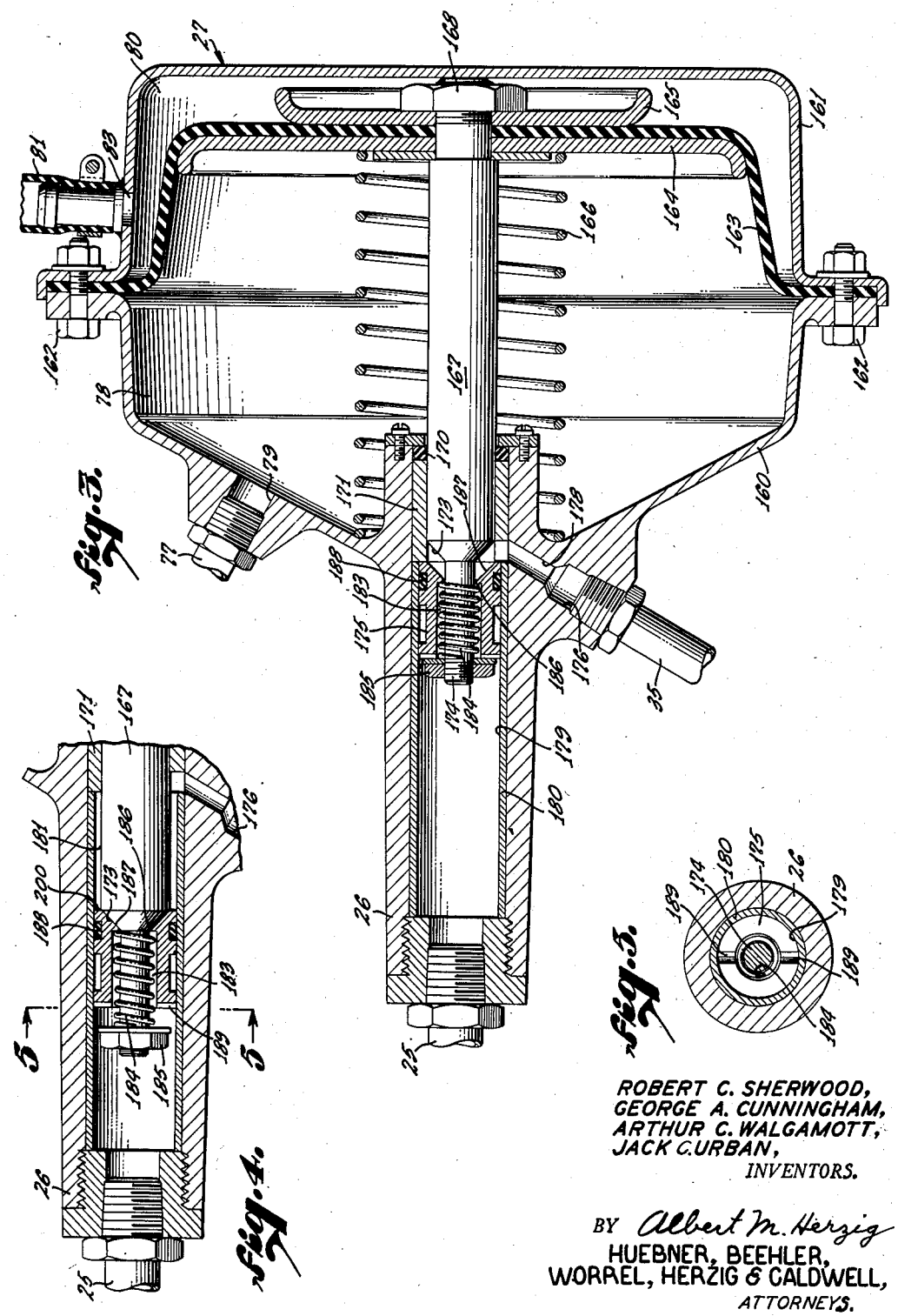

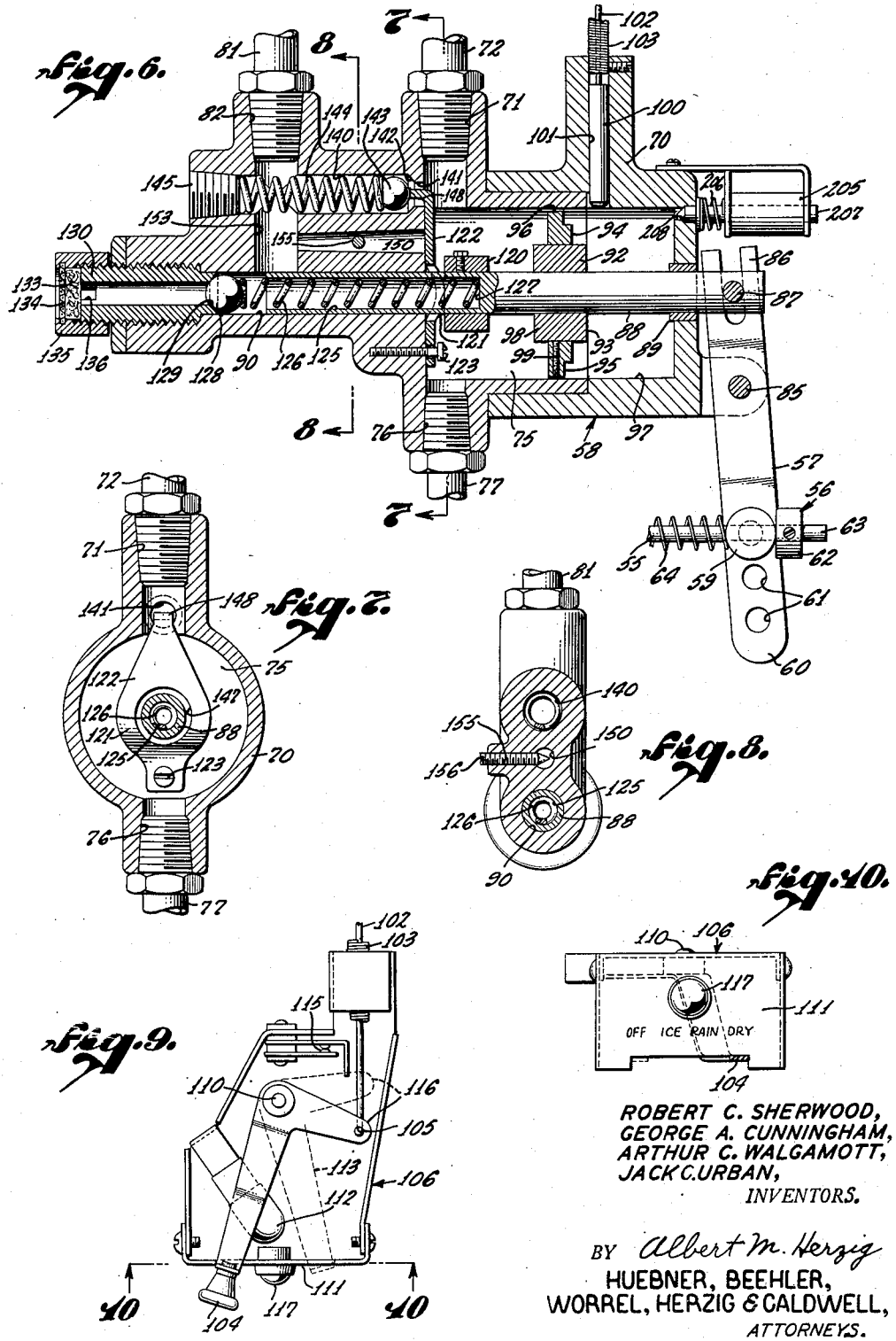

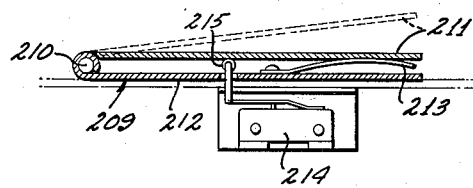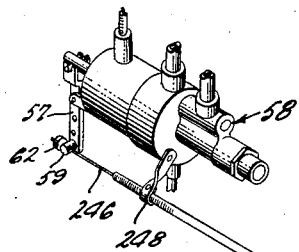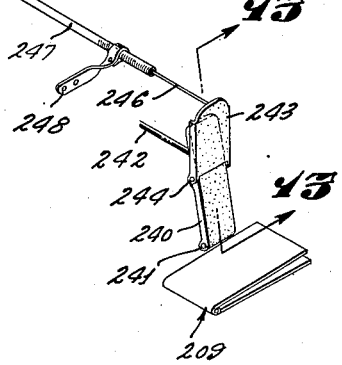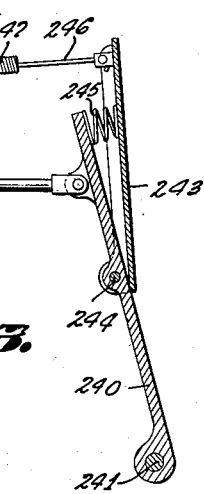

2,626,026

UNITED STATES PATENT OFFICE 2,626,026

ACCELERATOR BRAKE APPARATUS

Robert C. Sherwood, West Hollywood, George A. Cunningham, Arcadia, Arthur C. Walgamott, North Redondo Beach, and Jack C. Urban, North Hollywood, Calif., assignors, by mesne assignments, to said Sherwood and B. Delaray Mouron Application November 14, 1949, Serial No. 127,068

18 Claims. (Cl. 192—3)

This invention relates to brakes for motor vehicles and more particularly to a brake adapted for automatic actuation by the accelerator control.

For many years past great emphasis has been laid in methods of increasing acceleration and speed and power of motor vehicles, with the result that rapidity and dependability of braking becomes increasingly significant and important. Moreover, although the mechanical power and speed of motor vehicles have continued to increase and improve to a point where they can be operated to exceed man's normal mental and physical limitations—there is as yet unavailable to the general motoring public an economical and dependable means whereby mechanical speed and power can be mechanically and automatically harnessed and controlled. The motorists today stop their automobiles, yet do so as wagons were stopped 100 years ago—by pushing or pulling a braking pedal or lever which stops or decelerates their vehicles in relation to the amount of energy they, themselves, expend. Time and motion studies have demonstrated that a significantly large proportion of the time required to bring a speeding vehicle to a halt is expended in driver reaction and in initially transferring the foot, in foot accelerated vehicles, from the accelerator pedal from which it is removed to the brake pedal to which it must be applied.

Obviously, the first reaction of a driver is to quickly remove his foot from the accelerator pedal if a stop is indicated. It is among the objects of this invention to take advantage of such immediate reaction for simultaneously and substantially instantaneously decelerating the motor and applying the brakes without manual effort or expenditure of human energy, thereby minimizing the personal fatigue factor now arising from manually depressing the foot pedal every time decelerations and stops are required.

It is an object of this invention, however, to provide not only new and accelerator improved pedal construction as described in connection with the modified form of the invention hereinafter referred to, but also to provide optional automatic de-control means such that driver fatigue may be relieved and such that automatic involuntary removal of the driver's foot from the accelerator pedal will instantly de-control or de-energize the automatic apparatus.

In the light of the above and other considerations, it is among the objects of this invention to provide a new and improved efficient, foolproof, and economical means for utilizing mechanical, electrical and/or fluid power originating in the motor or other energy source of the vehicle for automatically applying the brakes (a) to stop or slow the vehicle, (b) to provide a hill-hold, and (c) to prevent creeping of fluid and the like transmissions.

It is another object of the invention to provide, in an accelerator braking mechanism of the desired character described, new and improved means by which the degree of braking power developed by the braking mechanism herein described may be manually pre-controlled and regulated by the driver from the driver's compartment.

Another object of the invention is the provision of new and improved means for accomplishing the desired result which may be readily applied to substantially all standard makes of automobile and like vehicles with a maximum of ease and a minimum of alteration in the existing vehicle construction and which, moreover, utilizes to a substantial extent and/or supplements the existing brake facilities.

It is another specific object of the invention to provide in a braking system preferably of the hydraulic type, although not confined to such type, an auxiliary braking system, method and means usable independently of the normal brake system or in conjunction and in addition thereto.

Another specific object of the invention is the provision of a new and improved pre-control unit for braking systems of the desired character described.

Another specific object of the invention is the provision of new and improved auxiliary power unit operatively connected to said control unit and optionally comprising an integral part thereof.

It is also among the objects of this invention to provide new and improved inter-connecting means for the operative connection of the units comprising the system or apparatus.

It is another further object of the invention to provide operative hydraulic means having fluid control, new and improved self-aligning features of operative mechanism, new and improved cushioning means for smooth and effective automatic manipulation of the brakes and a new and improved relatively rapidly acting brake release means.

It is a still further object of the invention to provide a method within the mechanism to permit the concurrent functioning and operation of this mechanical automatic braking system in conjunction, if so desired, with the conventional manually operated foot pedal systems now used on all motor vehicles.

The invention also contemplates among its objects the provision of a mechanism and method to accomplish the desired results of smooth and effective braking action and accurate and positive releasing action with minimum operative parts disclosing a simplicity of function, replaceability, economy and adaptability unknown to the prior art; and which is capable of economical mass production, individual servicing, adjustment, and replacement.

It is, moreover, among the objects of this invention to provide improvements over prior art, devices and systems, including parts thereof, heretofore intended to accomplish generally similar purposes.

With these and other objects in view, the invention consists in the construction, arrangement and combination of the various parts of the mechanism whereby the objects contemplated are attained as hereinafter set forth, pointed out in the appended claims, and illustrated in the accompanying drawings, wherein like parts are designated by like reference numerals.

In the drawings:

Figure 1 is a schematic perspective view of a preferred form of apparatus embodying this invention as installed in, and connected with the hydraulic braking system of, an automobile.

Figure 2 is a vertical elevational view of a carburetor linkage as embodied in this invention.

Figure 3 is a a vertical sectional view of the hydraulic power unit exemplifying this invention.

Figure 4 is a vertical sectional view of the left-hand end of the hydraulic power unit of Figure 3 but showing the parts in a different operative relationship.

Figure 5 is a vertical sectional view taken as on a line 5—5 of Figure 4.

Figure 6 is a vertical sectional view of a control unit exemplifying this invention.

Figure 7 is a vertical sectional view taken as on a line 7—7 of Figure 6.

Figure 8 is a vertical sectional view taken as on a line 8—8 of Figure 6.

Figure 9 is a dashboard control unit exemplifying this invention as viewed from the underside thereof.

Figure 10 is a front view taken as on a line 10—10 of said dashboard control unit.

Figure 11 is a vertical sectional view of an automatic de-control mechanism optionally comprising a portion of this invention.

Figure 12 is a fragmentary view, parts being cut away, of a modified form of accelerator construction embodying this invention.

Figure 13 is a vertical sectional view as on a line 13—13 of Figure 12.

Referring more particularly to the drawings, there is illustrated by way of example but not of limitation a hydraulic automobile brake system generally designated by the numeral 20 and comprising rear brake members 21 expandable against brake bands (not shown) by any conventional means, such as hydraulic cylinders 22.

Fluid conduits 23 connect the respective brake cylinders 22 as through a common conduit 24 to a conduit 25 communicating with the reduced end 26 of a hydraulic power unit generally designated at 27.

A T 28 may likewise serve as an interconnecting means for a common conduit 29, fragmentally shown, which may connect with cylinders, similar to those 22, associated with the front wheels (not shown) of the vehicle.

A conventional brake pedal 30 is connected to a conventional master hydraulic cylinder 31 of the usual type, so that by depression of the brake pedal (to the left, as illustrated in Figure 1) against the tension of a customary frame-anchored coil spring 32 as about a pivot 33, a plunger 34 pivotally secured to the pedal lever applies pressure to the brake fluid within the master cylinder and, through the conduit 35, reduced end 26 of the hydraulic power unit 27, as will be described, and conduits 25, 24 and 23 to the wheel cylinders 22, expanding the brake members 21 to apply the brakes in the usual fashion.

An optionally conventional accelerator pedal 40, pivoted as at 41 upon the floorboard or the like (not shown) of the automobile, has a link 42 pivotally connecting the same to a link 43, pivotally mounted at 44 as on a bracket 45 likewise secured to the frame of the automobile.

A link 46 pivotally connects the link 43 through a lost-motion connection 47 to the fuel control arm 48 of any conventional carburetor 49. The fuel control arm is pivoted as usual on a pin 50.

The lost-motion connection 47 comprises a sleeve 51 axially pivotally secured to the fuel control arm 48 and including a radial bore 52 therethrough for the longitudinal slidable accommodation of the link 46. A stop 53 fixedly secured to the link 46 prevents a retraction of the link 46 from the sleeve 51 beyond a predetermined amount. Rotation of the fuel control arm in a clockwise direction, as illustrated in Figures 1 and 2, increases the supply of fuel to the carburetor 49.

A link 55 pivotally connected to the link 43 at one of its ends is secured through a lost-motion connection, generally designated at 56, to a lever 57 of a control unit to be described generally designated at 58. The latter lost-motion connection 56 comprises a sleeve 59 axially pivotal upon one end 60 (cf., Figure 6) in any selected opening 61 in the lever 57 and through which the link 55 passes for slidable axial movement, but the extent of movement of such link in one direction is limited by a stop 62 fixed to the end 63 thereof. Said lost-motion connection 56 further comprises a compression spring 64 held in a normal condition of compression as between a frame bracket 65 and the sleeve 59.

The control unit 58 comprises a housing 70 including a manifold inlet 71 connected as through a conduit 72 to the vacuum manifold (not shown) of the automobile as by any threaded plug connection, or the like, 73 (Figure 1).

The vacuum side 75 of the interior of the housing 70 is thus in communication with the interior of the vacuum manifold, and, by means of a vacuum outlet 76 and a conduit 77, brings said vacuum manifold into preferably direct communication with the vacuum side 78 of the interior of the hydraulic power unit 27 as through a vacuum inlet 79.

The interior of the control unit 58 is also in selective communication, as will be shown, with the pressure side 80 of the hydraulic power unit 27, as through a conduit 81 extending from the pressure outlet 82 of the control unit 58 to the pressure inlet 83 of the hydraulic power unit 27.

The lever 57 is pivoted as at 85 to the housing 70 and has a yoke connection 86, including a pin 87, by means of which a rod 88 mounted for axial reciprocation within the housing 58, as through a substantially (but not necessarily) air-tight bushing 89 and a bore 90 communicating with the enlarged interior 75 of the housing.

Said rod 88 carries a stop 92 including an "off" abutment 93, an "ice" abutment 94, a "rain" abutment 95 and an end 96 preferably having a clearance from the wall 97 of the chamber 75. The "ice" and "rain" abutments may be adjustably keyed for axial movement upon the center 98 of the stop 92 as by means of a set screw 99.

A stop finger 100 axially slidable within a lateral bore 101 is moveable as by a wire 102 extensible within a flexible cable 103, controlled by a handle 104 (see Figure 9), pivotally connected thereto as at 105 in a dashboard control unit designated generally at 106.

Positions of the handle 104 in its pivotal wire and finger 100, extending movement upon a pin 110, are indicated by "off," "ice," "rain" and "dry" designations, or the like, upon a face plate 111 on the dashboard control unit whose operation and selective illumination as by a lamp 112 are referred to in the co-pending application of Clarence R. Adams, Robert C. Sherwood, and B. Deleray Mouron, Serial No. 127,192, entitled Accelerator Brake Control, and filed November 14, 1949.

Briefly, the dotted-outline position 113 of the handle 104 corresponds to the fully extended preset position of the finger 100 from the bore 101 whereby the same engages against the "off" abutment 93 of the stop 92, preventing movement of the rod 88 axially to the right, as illustrated in Figure 6. The solid-line showing of the handle 104 corresponds to a pre-set position of utmost retraction of the finger 100 within the bore 101, thereby permitting the end 96 of the stop 92 freely to pass said finger 100 in any movement of the rod 88 to the right, as illustrated in said Figure 6, i. e., such rod 88 may thereby move freely to the right in the "dry" pre-set position of the handle (cf., Figure 10). In said dotted-outline position 113, a switch 115 is opened by the end 116 of the handle 104, extinguishing the lamp 112 normally visible as through a red button 117. Movement of the handle to the position shown in solid-outline in Figure 9, optionally corresponding to pre-set positions other than "off," makes a circuit through the switch 111, illuminating the lamp 112 and warning the driver that the accelerator brake is in an operative selective position of any desired magnitude.

The rod 88 carries a stop 120 fixedly but optionally adjustably keyed thereto and abuttable as against a curved portion 121 of an arm 122, pivoted as on a bolt 123, in an extreme of leftward movement of the rod 88 within the housing 58, as illustrated in Figure 6, thereby rapidly forcing said arm 122 to the left, as will be explained.

The rod 88 likewise includes a co-axial bore 125 carrying a compression spring 126 normally confined therein in a position of some tension as by the bottom 127 of the bore and a ball check valve 128, or the like, the latter being held against seat 129 thereby. Such valve seat 129 is axially adjustable as by a threaded insert 130 forming the same and preferably carrying a filter 133 and a dust-catcher 134, the latter two elements being held on the insert 130 as by a cap nut 135. (Axial adjustment of the insert 130 may be occasioned as by a screw-driver receiving slot 136.)

The housing 58 has an equalizing or "dump" bore 140 communicating between the pressure outlet 82 and the vacuum inlet 71 through a restricted port 141, including a seat 142, against which a ball check valve, or the like, 143 is normally urged by a compression spring 144, the latter being adjustably held by a threaded plug 145.

The arm 122 includes an opening 147 to permit the free axial movement of the rod 88, and also includes a bent end 148 which is extensible through the port 141 for engagement against the ball check valve 143 to unseat the same at an extreme of leftward movement (Figure 6) of the rod 88, whereat the stop 120 engages against the curved portion 121 or other equivalent abutment upon the arm 122. Due to mechanical advantage, the end 148 of the arm 122 moves more rapidly than the rod 88.

Another bore 150 communicates between the pressure outlet 82 and atmosphere inlet port 152 through a common port 153 (which may be thought of as comprising in part the pressure or atmospheric side of the control unit 58), and with the interior 75 of the housing 58. The bore 150 may be controlled by a feathering valve element 155, preferably as by screw-driver slot 156 accessible from the exterior of the housing 70.

The hydraulic power unit 27 comprises a main housing element 160 and a cap 161 bolted thereto as at 162 to confine a pressure controlled diaphragm 163 held at its center by plates 164 and 165 in a conventional manner and normally urged in a position to the right, as illustrated in Figure 3, by a compression spring 166. A rod 167 mounted for self-alignment at 168 to the diaphragm 163 by means of the plates 164 and 165, and extends through a floating mounting at 169, including an O-ring, or the like, 170, a sleeve bearing 171 and, by means of a frustro-conical reduction 173 defining a reduced end 174, through a floating self-aligning and self-equalizing check plunger 175.

A pressure inlet 176 communicates with the conduit 35 leading from the master cylinder 31 and includes a passage 178 communicating laterally with a bore 179 formed as by a sleeve bearing 180. The sleeve bearing 180 has a larger diameter to the sleeve bearing 171, so that a clearance 181 defines a communicating annular passageway between the lateral passage 178 and the bore 179 which annular passage exists around the rod 176 in a position of extension of such rod within said bore 179 (cf., Figure 4).

The plunger 175 is loosely mounted upon the reduced end 174 of the rod 176 thereby defining an annular passage 183 therebetween.

A compression spring 184 bears between a jam nut 185, or the like, secured to the reduced end 174 and an annular shoulder 186 formed in the plunger 175, whereby a frustro-conical seat 187 formed in the floating plunger is normally urged against the complementary frustro-conical reduction 173 forming a seal therewith in positions of extension of the rod 176 within the sleeve bearing 179.

An O-ring 188 provides a further seal against leakage of fluid within the brake system past the plunger 175 during leftward movement (Figures 3 and 4) of the rod 167 following said engagement of the frustro-conical surfaces 173 and 187.

The annular shoulder 186 has a clearance laterally from the reduced end 174, so that a continuous fluid passage is provided from the passage 178 between the frustro-conical surfaces 173 and 187, between the plunger 175 and the reduced end 174 and through lateral passages 189 formed in the end of the plunger 175 opposite from the frustro-conical seat 187, all for a purpose and in a manner to be described.

*Operation*

The operation of the above described preferred embodiment of the invention is as follows:

The accelerator pedal 40 is conventionally in the solid-lined position thereof as shown in Figure 1 and designated by the numeral 195. Within a range of arcuate movement 196 there designated, the accelerator pedal 40 is in a so-called "neutral" position, neither increasing carburetion nor actuating control unit 58.

Within another or depressed range of arcuate movement 197, the accelerator pedal is within a conventional driving or accelerating range in which the stop 53 engages the sleeve 51 causing the fuel control arm to pivot and injecting gasoline or other fuel into the motor in a conventional manner. Likewise, in said accelerating range 197, the link 55, by virtue of the substituted lost-motion connection 56, moves freely to the left, as illustrated in Figure 1, or to the right, as illustrated in Figure 6, without actuating the lever 57 of the control unit 58.

When, however, the accelerator pedal 40 is moved into a range of pivotal positions 198 (Figure 1) corresponding to a clockwise rotative movement thereof around the accelerator pivot 41, e. g., by the spring 199 (as when the foot normally depressing such accelerator pedal is elevated to any desired extent or entirely removed), actuation of the braking mechanism is accomplished as follows:

The spring 199, or the like, secured as to the frame 65 and the link 43, or otherwise in a conventional manner, normally acts to urge the accelerator pedal 40 into the position illustrated in dotted-outline 198 in Figure 1, or in other positions of clockwise movement about the pivot 41 corresponding to deceleration. Said spring 199 is of such power that it readily overcomes any contrary urging of the spring 64 causing said movement of the accelerator pedal into the position 198, or other proximate positions thereto.

Such movement through the positions 198, by means of the linkages 42, 43 and 55, draws the lever 57 in a relatively counter-clockwise rotated movement about its pivot 85, as illustrated in Figure 1 (or in a relatively clockwise rotated movement thereabout as illustrated in Figure 6).

Movement of the lever 57 as indicated results in extension of the rod 88 from the housing 70, primarily under the influence of the spring 199, and to a minor extent, on account of the spring 126.

Extension of the rod 88 relieves the pre-adjusted tension of the coil spring 126 against the ball check 128 proportionately to the amount of such extension. Atmospheric air is thereby permitted to leak to an extent and with a speed corresponding to the extension of the rod 88, including the rapidity of such extension. Such atmospheric air passes into the bore 90 through the common port 153 and into the pressure outlet 82, whence it is conducted through the conduit 77 to the pressure side 80 of the power unit 27.

Simultaneously with the initial extension of the rod 88, and in order to prevent leakage of the atmospheric air coming through the screen 133 and the atmospheric inlet port 152, the stop 120, fixedly secured to the rod 88, moves away from its abutment against the arcuate position 121 of the arm 122, permitting the ball check 143, theretofore held away from its seat 142 by the bent end 148 of the arm 122, to close against said seat 142 under the influence of its coil spring 144.

Closing of the port 141 prevents leakage of the atmospheric air into the vacuum side 75 of the control unit 58, except as follows: the bore 150 serves to bleed air from the pressure or atmospheric side 153 of the control unit to the vacuum side 75 in a manner to insulate the braking system against any shock which might otherwise be occasioned by the instantaneous closing of the port 141. The amount and rate of such bleeding may be controlled by the feathering valve 155, and permits optimum pre-adjustment of the braking mechanism for smooth, yet effective, braking in vehicles of differing weights.

Inasmuch as the vacuum side 75 of the control unit is connected through the conduit 72 to the vacuum manifold of the vehicle, a pressure differential occurs within the control unit 58 upon the closing of the valve 143 and the opening of the valve 152. This differential is communicated through the conduits 77 and 81 to the pressure side 80 and the vacuum side 78 of the power unit 27, as heretofore noted. Thereby, the flexible diaphragm 163 is moved forcibly to the left, as illustrated in Figure 3, ordinarily with greater rapidity in its initial leftward movement than subsequently, on account of the relatively greater volume of the side 80 following such initial leftward diaphragm movement which is thereafter subjected to the force of atmospheric pressure more slowly, obviously due in part to the size of the fixed inlet 83.

Thus, the effect upon braking of the vehicle is initially rapid but without slamming action. That is to say, the brakes are initially applied with rapidity, and, thereafter, force is applied relatively more slowly, smoothly and effectively.

Bleeding as aforesaid through the bore 150 appears most important to the non-slamming and smooth braking of the Chrysler Corporation's automobiles of the years since the World War II. It is found indicated to greater or less extent in other vehicles depending largely, as aforesaid, upon their weight.

Leftward movement of the diaphragm 163, as noted, carries with it the rod 167. The floating plunger 175 is thereby urged axially to the right, as illustrated in Figures 3 and 4, and by the action of its compression spring 184 and fluid back-pressure in the conduits 25, etc., causes engagement of frustro-conical surfaces 187 and 173, providing a piston type seal to act on the braking fluid with which the brake system is flooded.

Thereafter, forced movement of the plunger and rod to the left (Figures 3 and 4) communicates corresponding pressure to the braking cylinder 22 through the conduits 25, 24, 23, 29, etc., whereby the brake members 21 are actuated to apply the brakes.

It will be noted that the annular passage 183 provides a clearance between the reduced end 174 of the rod and the floating plunger 175, even at the most restricted portion corresponding to the annular shoulder 186. By this construction, an added pressure to that applied by the accelerator operated apparatus, heretofore described, may be exerted by means of the customarily provided brake pedal 30 through the master cylinder 31, the conduit 35, the passage 178, the annular passage 181 (Figure 4) and the annular passage 183, thence past the nut 185 and into the conduits 25, 24 and 23 leading to the brake cylinders 22, as heretofore noted. This added pressure exerted by the foot pedal 30 serves in the conventional manner to increase the braking effect during any emergency, particularly if the accelerator operated system is adjusted to give relatively minimum amount of braking, as will be explained. If the pedal 30-applied pressure is sufficient to overcome the seating forces exerted against the frustro-conical seats 173 and 187 by the diaphragm 163, the added braking force will be manifested through a leakage of fluid between such frustro-conical seats from the master cylinder 31, as heretofore noted, past the floating plunger 175. Ordinarily, however, the pressure exerted by such diaphragm is great enough that such added pressure by the applied pedal 30 serves merely, by its application against the end 200 of the floating plunger, to assist the action of the diaphragm 163 by relieving to some extent the back pressure from the brake cylinders 22. The net effect in either case is an increased effective braking force. Moreover, such construction permits braking in the conventional manner in event of a failure or de-control of the automatic system.

From the above description, it will be apparent that rapidity and force of braking is determined to a considerable extent by the rapidity of the leakage of air from the atmosphere past the check valve 128. Since the seating of this check valve is covered by the tension exerted by its coil spring 126, the entrance of atmospheric air into the pressure side of the system will be greater the more the rod 88 is extended from the housing 70.

The finger 100, controlled through the linkage associated with the handle 104, is manipulated from the dash panel of the vehicle. The completely retracted position thereof within the bore 100, as shown in Figure 6, permits the free movement of the rod 80 to the right, together with its stop 92 keyed thereto as previously noted. Such fully retracted position of the finger 100 thereby provides a maximum automatic braking effect, corresponding to the "dry" notation upon the dashboard control unit 106.

Successively lesser braking is permitted by engaging the finger 100 against the abutment 95 "rain," the abutment 94 "ice" and the abutment "off" 93. The latter position, preventing movement of the rod 85 to the right, is in effect the de-control position of the control unit rendering the automatic accelerator operated apparatus non-functional. In such "off" position, therefore, the vehicle brakes are necessarily controlled in the conventional manner through the brake pedal 30.

In such "off" or de-controlled position of the apparatus (cf., Figure 6), the accelerator pedal 40 will be in a position 196 or 197. The rod 88 will be in a position of utmost retraction within the housing 70. During retraction, movement of the rod 88 from its extended brake operating position, heretofore described, by its stop 120 will, but only at the position substantially corresponding to its extreme limit of leftward movement, engage against the curved portion 121 of the arm 122 in a manner to force the ball valve 143 off its seat 142 by means of the bent end 140. Any residue or differential pressure between the pressure side (e. g., common port 153, etc.) and the vacuum side 75 of the control unit 58 will be instantaneously equalized through the port 141.

It is important to note that this "dumping" of any residue of air under pressure from the pressure side of the control unit and the corresponding pressure side 80 of the power unit through conduit 77 permits the diaphragm 163 and its associated plunger mechanism to return promptly to its normal and operative position, illustrated in Figure 3, assuring complete and instant release of the brakes and preventing the undesired "bucking" movement of the vehicle so frequently encountered in manual braking.

In its above described operation, the brake mechanism herein illustrated and described has been found to operate positively and effectively, but with smoothness and lack of slamming during brake application, or galloping or bucking during release of such braking, more nearly corresponding to operating ideals than can be accomplished by any but the most experienced operator manually controlling a conventional braking system.

By way of example only, the proportions of the device being approximately as drawn, an apparatus in accordance with the teaching of the instant invention has proven satisfactory when the spring 144 is rated at 4 ounces and is so adjusted as to seal against 20 pounds of vacuum in the "off" position of the apparatus, when the main diaphragm spring 166 exerts 8 inch pounds of pressure when extended and 36 inch pounds when compressed, and when the plunger spring 184 exerts a force of 4 inch pounds. The amount of travel of the plunger 175 as between its position shown in Figure 3 and its position shown in Figure 4 has been found satisfactory at approximately $\frac{3}{32}$ of an inch, while the clearance between the reduced end 174 and such plunger at its maximum constriction in the annular shoulder region 186 and between the rod 88 and bearing 89 are, respectively, .0015 inch.

In a modified form of this invention a solenoid 205 may be employed which utilizes a spring 206 normally urging a plunger 207 to the left as illustrated in Figure 6 for closing an aperture 208 communicating between the atmosphere and the vacuum side 75 of the control unit 58.

A heel plate indicated generally at 209 includes a hinge pin 210 pivotally connecting an upper movable plate 211 and a lower stationary plate 212 secured to the floor of the vehicle. A leaf spring or the like 213 normally urges the movable plate 211 to an upper position illustrated in dotted-outline in Figure 11. A micro-switch or the like 214 includes an actuating arm 215 depressed when the movable plate 211 is in a depressed position as illustrated in Figure 11 corresponding to the position said upper plate would take when the heel of an operator's foot rests thereupon in a normal accelerator manipulating position.

The micro-switch 214 is normally closed, but the electrical conductors connecting the same to the battery of the vehicle are connected through the ignition switch so that a leakage of current is prevented when the vehicle is not in use. By this construction the solenoid 205 is de-energized when the operator's foot rests upon the heel plate 209, thereby opening the switch 214. The coil spring 206 then urges the plunger 207 to the left (Figure 6) to seal the atmospheric aperture 208. However, when the operator removes his foot from the heel plate 209, whether voluntarily or involuntarily, as might occur to rest the same or when an inexperienced operator suddenly removes his foot from the accelerator to apply the brake pedal 30, the solenoid 205 is energized. The spring 206 is thereby overcome and the plunger 207 is withdrawn from the aperture 208. Leakage of atmospheric air into the vacuum side 75 of the control unit 58 equalizes pressure upon both sides of the diaphragm 163 of the power unit 27, thereby automatically de-energizing said power unit so that pressure from the brake pedal 30 and master cylinder 31 exerts a brake pressure independently of the automatic apparatus, if separately activated.

It may be observed that the micro-switch and its associated solenoid 205 or the like are intended as a safety factor in the event of complete withdrawal of the operator's foot from the accelerator. During normal driving the heel of the operator's foot will rest upon the heel plate 211 and during normal driving will be retained there. Thereby, braking and accelerating will be accomplished by manipulation of the toe of his foot or angulation thereof for depressing or releasing the accelerator pedal and/or the upper sole plate.

A modified form of pedal construction, as illustrated in Figures 12 and 13, involves the provision of a modified accelerator pedal 240 operatively mounted upon a pivot 241 of a customary lever rod 242 for actuating the carburetor in the conventional manner. To said modified pedal 240, an upper sole plate 243 is pivoted at 244. A spring 245 or the like is positioned in such a manner as to retain the upper sole plate in a position of extreme clockwise movement as illustrated in Figures 12 and 13. As illustrated, the spring 245 is disposed between the upper sole plate and the modified pedal 240. Any other equivalent position, such as between the upper sole plate and the toe-board or other frame or body portion of the vehicle, would cause the spring to perform the desired function in an equal or better manner, particularly since the latter location would render the modified pedal and the upper sole plate relatively more independent of one another. That is to say, depression of the upper sole plate 243 should have no tendency, until the direct contact of the one with the other, to depress the modified pedal 240.

The upper sole plate construction has the advantage of easing the braking operation through the instant invention by relieving the usually more acute angle of the heel and toe of the operator required for braking the instant apparatus in the first form of Figure 1.

The upper sole plate 243 is connected by a wire 246 to the lever 57 in a similar manner to that illustrated for the first embodiment of the invention, and for this reason, like parts in both embodiments are designated by like reference numerals. However, in the instant embodiment, the wire 246 passes through a flexible casing normally secured to the frame or the housing 70.

The general combination and system herein described and illustrated to accomplish the desired purpose may be duplicated by wholly mechanical means, wholly electrical means, wholly hydraulic means and especially combinations of these within the ability of one skilled in the art. The specific form of the invention illustrated and described, however, has been found to function to the best advantage particularly on hydraulic braking systems. Notwithstanding, therefore, the desirability of the system as a whole as herein conceived, the particular units and sub-combinations employed as herein described and illustrated have performed so adequately in operation, are so simple in construction and economical to manufacture that their particular specified construction, without limiting the generality of the foregoing, is likewise considered an essential feature of this invention.

This invention not only meets, but transcends the problems above referred to as hereinafter set forth. For example, the operative principles and devices of the invention provide an automatic "no roll" feature, operative as a hill-holder for the vehicle on upgrades and/or downgrades. In addition, particularly useful in "fluid drive" and the like, automatic or "shiftless" transmissions, this invention likewise automatically eliminates the dangerous and undesired "creeping" tendency of the vehicle while the engine is idling.

It will be apparent to one skilled in the art that accelerator brake apparatus may be utilized as an auxiliary to the conventional braking system, or independently thereof. It, moreover, is apparent that a braking apparatus and/or system corresponding in function and result to that hereinabove described may be utilized for motorcycles as well as automobiles and trucks and may be actuated by fluid pressure means as well as vacuum means, or, if desired, by electrical means, or mechanical or by any combination of the specified means. Thus, for example, by reversal of parts and modifications of structure, one skilled in the art might adapt the teachings of the instant invention for operation by the exhaust manifold or other pressure exerting systems of the vehicle in lieu of the vacuum manifold herein specified.

While we have herein shown and described what we conceive to be a most desired form of this invention, it is understood that alterations and modifications thereof may be made in a manner to satisfy the spirit of the invention which is intended to comprehend any and all equivalent devices, apparatuses and methods in accordance with the spirit thereof and as comprehended in the following claims.

This invention features provision of appropriate apparatus to accomplish accelerator braking to simulate as closely as possible ideal braking requirements. It is additionally possible, by the use of a free-floating pivot for the accelerator pedal, to permit the removal by the operator of his foot entirely from such pedal without thereby actuating the accelerator brake system due to the loss of leverage occurring by the present provision of a fixed pivot.

Having thus described our invention, what we claim as new and desire to secure by Letters Patent is:

1. In a motor vehicle accelerator brake apparatus for hydraulic brake systems: a housing defining a chamber, a fixed partition separating said chamber into a pressure side and a vacuum side, atmospheric valve means selectively permitting passage of atmospheric air into the pressure side of said chamber, equalizing valve means selectively permitting passage of atmospheric air from said pressure side to said vacuum side of said chamber, linkage means operated by the accelerator for selectively actuating each of said valve means, whereby in one pre-selected actuation of the accelerator said atmospheric valve means is opened and said equalizing valve means is closed, and whereby in a second pre-selected actuation of the accelerator said equalizing valve means is opened and said atmospheric valve means is closed.

2. In a motor vehicle brake apparatus as characterized in claim 1, said equalizing valve means comprising a spring loaded check valve between said pressure and vacuum sides normally preventing a flow from the pressure to the vacuum side, plunger means operated by said linkage means and including check valve release means adapted at an extreme of pre-determined movement of the plunger means to unseat said spring loaded check valve.

3. In a motor vehicle accelerator brake apparatus of the character described for hydraulic brake systems: a housing defining a chamber, a partition separating said chamber into a pressure side and a vacuum side, atmospheric valve means selectively permitting passage of atmospheric air into the pressure side of said chamber, equalizing valve means selectively permitting passage of atmospheric air from said pressure side to said vacuum side of said chamber, linkage means operated by the accelerator for selectively actuating each of said valve means, whereby in one pre-selected actuation of the accelerator said atmospheric valve means is opened and said equalizing valve means is closed, and whereby in a second pre-selected actuation of the accelerator said equalizing valve means is opened and said atmospheric valve means is closed, said equalizing valve means comprising a spring loaded check valve between said pressure and vacuum sides normally preventing a flow from the pressure to the vacuum side, plunger means operated by said linkage means and including check valve release means adapted at an extreme of pre-determined movement of the plunger means to unseat said spring loaded check valve, said partition being formed with a bleeder passageway communicating between pressure and vacuum sides of the chamber, a feathering valve actuatable from the exterior of the housing for controlling the size of said passageway.

4. In a motor vehicle brake apparatus as characterized in claim 1, said equalizing valve means comprising a spring loaded check valve between said pressure and vacuum sides normally preventing a flow from the pressure to the vacuum side, plunger means operated by said linkage means and including check valve release means adapted at an extreme of pre-determined movement of the plunger means to unseat said spring loaded check valve, pre-selective control means actuatable from the driver's compartment for limiting the axial extension of said plunger whereby to control the force of said spring associated with said atmospheric valve means.

5. In a motor vehicle brake apparatus as characterized in claim 1, said equalizing valve means comprising a spring loaded check valve between said pressure and vacuum sides normally preventing a flow from the pressure to the vacuum side, plunger means operated by said linkage means and including check valve release means adapted at an extreme of pre-determined movement of the plunger means to unseat said spring loaded check valve, selective stop means carried by said plunger, said atmospheric valve means comprising a check valve element including a spring between such element and the plunger means normally holding said element closed against atmospheric pressure, and selective finger means extensible from the driver's compartment co-operable with said stop means, for limiting the maximum axial extension of said plunger whereby to control the force of said spring normally holding said atmospheric valve means closed.

6. In a motor vehicle brake apparatus as characterized in claim 1, said equalizing valve means comprising a spring loaded check valve between said pressure and vacuum sides normally preventing a flow from the pressure to the vacuum side, plunger means operated by said linkage means and including check valve release means adapted at an extreme of pre-determined movement of the plunger means to unseat said spring loaded check valve, a powered means including a fluid controlled diaphragm separating said housing unit into a vacuum chamber and a pressure chamber, a plunger rod connected to said diaphragm, a floating fluid-tight bearing means adapted to permit reciprocation of the plunger rod within said powered means, a fluid outlet in the powered means co-axial with said plunger rod, a floating plunger-check means connected to said plunger rod, said plunger-check means and said rod including complementary seats upon adjacent ends thereof adapted to prevent fluid flow in said fluid outlet in one direction, but permitting a flow in the other direction, said brake system including a master cylinder, a pressure inlet communicating from the master cylinder of the hydraulic braking system and between the plunger-check and the rod, and fluid conduit means interconnecting between said master cylinder and the pressure sides of the housing and powered means and the vacuum sides thereof, respectively, whereby vacuum and pressure are selectively transmitted between them and from a vacuum source of the motor vehicle.

7. In a motor vehicle accelerator brake apparatus of the character described for hydraulic brake system: a housing defining a chamber, a partition separating said chamber into a pressure side and a vacuum side, atmospheric valve means selectively permitting passage of atmospheric air into the pressure side of said chamber, equalizing valve means selectively permitting passage of atmospheric air from said pressure side to said vacuum side of said chamber, linkage means operated by the accelerator for selectively actuating each of said valve means, whereby in one pre-selected actuation of the accelerator said atmospheric valve means is opened and said equalizing valve means is closed, and whereby in a second pre-selected actuation of the accelerator said equalizing valve means is opened, said atmospheric valve means is closed, said equalizing valve means comprising a spring loaded check valve between said pressure and vacuum sides normally preventing a flow from the pressure to the vacuum side, plunger means operated by said linkage means and including check valve release means adapted at an extreme of pre-determined movement of the plunger means to unseat said spring loaded check valve, a powered means including a fluid controlled diaphragm separating said housing unit into a vacuum chamber and a pressure chamber, a plunger rod connected to said diaphragm, a floating fluid-tight bearing means adapted to permit reciprocation of the plunger rod within said powered means, a fluid outlet in the powered means co-axial with said plunger rod, a floating plunger-check means connected to said plunger rod, said plunger-check means and said rod including complementary seats upon adjacent ends thereof adapted to prevent fluid flow in said fluid outlet in one direction, but permitting a flow in the other direction, said brake system including a master cylinder, a pressure inlet communicating from the master cylinder of the hydraulic braking system and between the plunger-check and the rod, and fluid conduit means interconnecting between said master cylinder and the pressure sides of the housing and powered means and the vacuum sides thereof, respectively, whereby vacuum and pressure are selectively transmitted between them and from a vacuum source of the motor vehicle, a carburetor for said vehicle and an accelerator, a linkage between the carburetor and the accelerator adapted to permit the accelerator to move into a position of accelerator-braking.

8. In a motor vehicle brake apparatus as characterized in claim 7, a lost motion linkage between the carburetor and the accelerator adapted to permit the accelerator to move into a position of accelerator-braking, a linkage means between the accelerator and the first mentioned plunger means whereby said accelerator may be actuated in a non-braking position without actuating the accelerator-brake mechanism.

9. In a motor vehicle brake apparatus as characterized in claim 7, a carburetor linkage between the carburetor and the accelerator adapted to permit the accelerator to move into a position of accelerator-braking, a linkage means between the accelerator and the first mentioned plunger means whereby said accelerator may be actuated in a non-braking position without actuating the accelerator-brake mechanism, said accelerator comprising an accelerator pedal pivoted to the floor-board of the vehicle and a toe-operated means pivoted to the accelerator pedal, said linkage means secured to and controlled by said toe-operated means, and said carburetor linkage being secured to and controlled by said accelerator pedal, and resilient means normally urging said toe-operated means and said accelerator pedal in pivotal positions of respective retraction and separation.

10. The accelerator brake apparatus of claim 7 but wherein said pressure inlet communicates from the master cylinder of the hydraulic braking system to the brake cylinders of the vehicle bypassing said plunger check means.

11. An accelerator brake apparatus for motor vehicles having a foot accelerator, a brake means of conventional hydraulic construction and a power source, the novelty comprising: a vacuum power means deriving its energy from the motor of said vehicle, linkage means between the accelerator, the power source and the brake means actuable by the accelerator to apply braking pressure to the brake means in a pre-selected position of the accelerator, valve means selectively actuatable by the accelerator for distributing said power selectively to said brake means, and power transmitting means controlled by said valve means for selectively applying primary force to said brake means, pre-selector means controllable from the driver's compartment for selectively limiting the application of said brake means in any pre-selected position of the accelerator, and decontrol means usually continuously actuated by the driver during acceleration control for maintaining said valve means in a power transmitting position, and for normally preventing transmission of said power to said brake means when non-actuated by the driver.

12. An accelerator brake apparatus for motor vehicles having a foot accelerator, a brake means of conventional hydraulic construction and a power source, the novelty comprising: a vacuum power means deriving its energy from the motor of said vehicle, linkage means between the accelerator, the power source and the brake means actuatable by the accelerator to apply braking pressure to the brake means in a pre-selected position of the accelerator, valve means selectively actuatable by the accelerator for distributing said power selectively to said brake means, and power transmitting means controlled by said valve means for selectively applying primary force to said brake means, pre-selector means controllable from the driver's compartment for selectively limiting the application of said brake means in any preselected position of the accelerator, and decontrol means including substantially horizontal pressure plate means adapted to receive the vertical component of the weight of an operator's foot adjacent the accelerator, and being thereby usually continually depressed by the driver during acceleration control for maintaining said valve means in a power transmitting position, and for normally preventing transmission of said power to said brake means when non-actuated by the driver.

13. In an accelerator brake apparatus as characterized in claim 12, said decontrol means further comprising an electrical circuit including a micro-switch disposed beneath the plate means and actuatable thereby, a coil means and an auxiliary means controlled by said coil, a source of electrical energy for said circuit, said auxiliary means being adapted to prevent the effective brake-applying operation of said first-named valve means.

14. In an accelerator brake apparatus as characterized in claim 12, said decontrol means further comprising an electrical circuit including a micro-switch disposed beneath the plate means and actuatable thereby, a coil means and an auxiliary means controlled by said coil, a source of electrical energy for said circuit, said auxiliary means being adapted to prevent the effective brake-applying operation of said first-named valve means, said auxiliary means comprising a valve element, said first-named valve means comprising a housing for confining a vacuum for applying said brake means, said housing having an opening therein communicating between the atmosphere and the interior thereof, said valve element including a spring normally urging said element into said opening to seal the same and being retractable from said opening to destroy said vacuum when attracted against said spring tension by said coil.

15. In a motor vehicle accelerator brake apparatus of the character described for hydraulic brake systems: a housing defining a chamber, a partition separating said chamber into a pressure side and a vacuum side, atmospheric valve means selectively permitting passage of atmospheric air into the pressure side of said chamber, equalizing valve means selectively permitting passage of atmospheric air from said pressure side to said vacuum side of said chamber, linkage means operated by the accelerator for selectively actuating each of said valve means, whereby in one preselected actuation of the accelerator said atmospheric valve means is opened and said equalizing valve means is closed, and whereby in a second pre-selected actuation of the accelerator said equalizing valve means is opened and said atmospheric valve means is closed, said equalizing valve means comprising a spring loaded check valve between said pressure and vacuum sides normally preventing a flow from the pressure to the vacuum side, plunger means adapted at an extreme of predetermined movement of the plunger means to unseat said spring loaded check valve, said partition being formed with a bleeder passageway communicating between pressure and vacuum sides of the chamber.

16. In a motor vehicle accelerator brake apparatus of the character described for hydraulic brake systems; housing means defining a pressure chamber and a vacuum chamber, atmospheric valve means selectively permitting passage of atmospheric air into the pressure chamber, equalizing valve means selectively permitting passage of atmospheric air from the pressure chamber to the vacuum chamber, linkage means operated by the accelerator for selectively actuating said valve means, whereby in one pre-determined actuation of the accelerator said atmospheric valve means is opened and said equalizing valve means is closed and whereby in a second pre-determined actuation of the accelerator said equalizing valve means is opened and said atmospheric valve means is closed.

17. In a hydraulic brake apparatus for motor vehicles as described, including an accelerator controlled fluid power means and including fluid conduits interconnected with said power means; a hydraulic pressure means interconnected with said fluid braking apparatus and including a plunger having a check valve portion including fluid passageways in said check valve portion, said check valve portion and said plunger being engageable in fluid-tight relationship in one operative direction of reciprocation of said plunger, said check valve portion being adapted to permit the discharge of fluid in an opposite direction, accelerator means for said vehicle, and means operatively interconnected between said accelerator means, said fluid power means and said hydraulic pressure means for actuating said plunger, a housing for said plunger normally occupied by said check valve portion, and a fluid inlet from the brake-pedal actuated hydraulic cylinder intercommunicating within said housing back of said check valve portion and in communication with said brake system and operative to inject brake fluid behind said check valve portion independently of the operation of said plunger.

18. In a hydraulic brake apparatus for motor vehicles as described, including an accelerator controlled fluid power means and including fluid conduits interconnected with said power means; a hydraulic pressure means interconnected with said fluid braking apparatus and including a plunger having a check valve portion including fluid passageways in said check valve portion, said check valve portion and said plunger being engageable in fluid-tight relationship in one operative direction of reciprocation of said plunger, said check valve portion being adapted to permit the discharge of fluid in an opposite direction, accelerator means for said vehicle, and means operatively interconnected between said accelerator means, said fluid power means and said hydraulic pressure means for actuating said plunger, a housing for said plunger defining a passageway therearound and normally occupied by said check valve portion, and a fluid inlet from the brake-pedal actuated hydraulic cylinder intercommunicating within said housing around said plunger back of said check valve portion and in communication with said brake system and operative to inject brake fluid behind said check valve portion independently of the operation of said plunger.

ROBERT C. SHERWOOD.
GEORGE A. CUNNINGHAM.
ARTHUR C. WALGAMOTT.
JACK C. URBAN.

REFERENCES CITED

The following references are of record in the file of this patent:

UNITED STATES PATENTS

| Number | Name | Date |
| --- | --- | --- |
| 1,824,050 | Joers | Sept. 22, 1931 |
| 2,109,101 | Clarke | Feb. 22, 1938 |
| 2,152,060 | Kliesroth | Mar. 28, 1939 |
| 2,165,817 | Safford | July 11, 1939 |
| 2,207,041 | Vau | July 9, 1940 |
| 2,260,490 | Stelzer | Oct. 28, 1941 |
| 2,279,458 | Harkness | Apr. 14, 1942 |
| 2,316,396 | Breeze | Apr. 13, 1943 |